United States Patent Office 3,833,684
Patented Sept. 3, 1974

3,833,684
STABLE, HOMOGENEOUS SOLUTIONS OF POLYALKYL GLUTAMATES CONTAINING DISSOLVED ELASTOMERS
Akira Akamatsu, Kazushi Togo, and Makoto Iwatsuki, Kanagawa, Japan, assignors to Ajinomoto Co., Inc., Tokyo, Japan
No Drawing. Continuation-in-part of abandoned application Ser. No. 99,693, Dec. 18, 1970. This application Oct. 16, 1972, Ser. No. 297,982
Claims priority, application Japan, Dec. 10, 1969, 44/1,751
Int. Cl. C08g 41/044
U.S. Cl. 260—857 UN         7 Claims

ABSTRACT OF THE DISCLOSURE

A stable, clear homogeneous solution of a polyalkyl glutamate and of an elastomer is produced by polymerizing an optically active γ-lower-alkyl glutamate N-carboxy anhydride in a solution of the elastomer, if the elastomer is inert to the anhydride and to the polyalkyl glutamate produced under the polymerization conditions, and the polyalkyl glutamate is soluble in the solution. Shaped objects and coatings combining the desired properties of both polymers may be prepared from the solutions.

---

This application is a continuation-in-part of the copending application Ser. No. 99,693, filed Dec. 18, 1970, and now abandoned.

This invention relates to shaped objects and coatings whose important ingredient is at least one polyalkyl glutamate, and to solutions from which such objects and coatings may be prepared. More particularly, the invention relates to blends of polyalkyl glutamates and elastomers.

Fiber, films, or other shaped articles of poly-γ-lower-alkyl glutamate (hereinafter abbreviated PAG) have excellent thermal resistance, weather resistance, and moisture permeability. Surface layers of artificial leather have been prepared from PAG and closely resemble the natural product in appearance and touch. However, films of PAG have low elongation and poor elastic recovery so that no other significant applications were found heretofore for this material.

It has been attempted to improve the mechanical properties of PAG by blending the material in solution with elastomers, but the compatibility of PAG with commonly used elastomers is limited. When a solution of PAG and of significant amounts of elastomer is produced in a concentration practical for the intended purpose, the solution is turbid and further decomposes on standing by gelling or phase separation, but even a turbid solution cannot always be produced.

It is believed that the poor compatibility of PAG with elastomers is due to the micelle formation of PAG molecules in solution, the molecules having an α-helix structure, and several molecules readily associating with each other to form relatively large aggregates. The strong cohesive forces which attract the molecules to each other cannot be overcome by mere mechanical agitation so that mixing a PAG solution with that of an elastomer is not successful. The films or other objects formed from turbid solutions or two-phase systems lack all the desired properties.

It has now been found that a homogeneous and clear solution of PAG and an elastomer in a common solvent may be prepared by polymerizing an optically active γ-alkyl glutamate N-carboxy anhydride (hereinafter referred to as AG-NCA) while dispersed in a solution of the elastomer. The AG-NCA is held under polymerization conditions, not novel in themselves, in the presence of a suitable polymerization initiator. The liquids so obtained are fluid, homogeneous, and transparent even if the concentration of PAG and elastomer is such that only a turbid solution or a two-phase system can be prepared by conventional methods. Films and other objects or coatings formed from the polymerization mixtures have the desired combination of properties of PAG and of the elastomer.

The blended solutions may be prepared from all γ-lower-alkyl glutamate-N-carboxy anhydrides in which the lower alkyl group has up to four members, that is, γ-methyl, γ-ethyl, γ-propyl, and γ-butyl glutamate N-carboxy anhydride having straight or branched alkyl groups.

The elastomers employed are those which are chemically inert to the monomer, that is, the AG-NCA, and the polymer, that is, the PAG, under the polymerization conditions. Their chemical structure is otherwise not critical.

More specifically, the elastomer should be free from terminal amino groups, oxirane groups, and isocyanate groups which would tend to promote the formation of block copolymers of the elastomer with the polyalkyl glutamate formed. Useful blends or intimate mixtures of PAG and elastomer in the solid state have been prepared by polymerizing AG-NCA in the presence of dissolved natural rubber, polychloroprene, isoprene-isobutylene copolymer, acrylonitrile-butadiene copolymer, butyl rubber, polybutene, butadiene-styrene copolymer, polybutadiene, polyisoprene, chlorinated polyethylene, ethylene-propylene copolymer, polyalkyl acrylates, and their mixtures.

Polyalkyl acrylates and polychloroprene have been found to be particularly effective in improving the mechanical properties of PAG.

The ratio of the elastomers and of the AG-NCA in the polymerization mixture, and the resulting ratio of elastomer and PAG in the ultimate product, may be varied widely depending on the intended use of the polymerization solution and the nature of the ingredients. For greatest improvement in the elongation and elastic recovery of the PAG, the weight ratio of the AG-NCA to the elastomer in the polymerization mixture should be between about 9:1 and about 2:3. When the PAG is not predominant or at least an important component of the ultimate blend, its desirable characteristics are not fully maintained.

The polymerization is carried out in any organic solvent system in which the PAG produced and the elastomer are soluble, and which does not interfere with the polymerization of the AG-NCA. Inert solvents capable of dissolving PAG include, but are not limited to, methylene chloride, 1,2-dichloroethane, 1,1,2-trichloroethane, chloroform, 1,1,2,2-tetrachloroethane, benzene, toluene, xylene, ethyl acetate, butyl acetate, methylethylketone, methyl-i-butylketone, dimethylformamide, N-methyl-pyrrolidone, dimethylsulfoxide, and mixtures of these solvents, and should be selected to suit the elastomer. While the listed solvents are generally effective, some are preferable to others with specific monomers, and some experimentation may be necessary under specific conditions for establishing the most suitable solvent system. The latter may also contain organic liquids useful for dissolving the elastomer or for other reasons, but not capable of dissolving PAG. Representative non-solvents for PAG which may form a portion of the solvent system are dimethyl ether, acetonitrile, tetrahydrofuran, carbon tetrachloride, 1,1-dichloroethane, 1,1,1-trichloroethane, dichloroprane, 1,1,2-trichloroethylene, perchloroethylene, and ligroin, which may be present in amounts smaller than would interfere with the polymerization of AG-NCA or cause precipitation of PAG or gelation.

The polymerization initiators employed in the method of this invention are not important in themselves, and any known polymerization initator for AG-NCA may be used. Suitable initiators thus include amines, such as triethylamine, tri-n-butylamine, triethylenediamine, and diethanolamine, and alkali metal hydroxides, such as sodium or potassium hydroxide. The polymerization is preferably carried out at −20° to 30° C., and interference, if any, of the elastomer with the polymerization may be avoided by operating at the low end of this range.

In performing the method of this invention, the AG-NCA may be dispersed, that is, dissolved or suspended in a solution of the elastomer in a suitable solvent, the dispersion brought to the desired polymerization temperature, and an initiator added. The polymerization reaction starts promptly and goes to completion within a period which may vary from one hour to 48 hours, depending on operating variables.

The solvent has to be removed during all practical applications of the polymerization mixtures. The initial concentrations of the AG-NCA and of the elastomer should be chosen, therefore, to produce a polymerization solution in which the combined weight of the polyglutamate and of the elastomer is at least 10% of the weight of the polymerization mixture. It is characteristic of the solutions of the invention that they are clear and homogeneous at total polymer concentrations of at least 10% by weight, and remain clear and homogeneous when diluted with the initially employed solvent to a combined concentration of 10% by weight of the elastomer and of the polyglutamate, as may be required for reducing the viscosity of the solution prior to a coating application.

The blended polymer solution may be used directly as a dope for preparing films, fibers, or other shaped articles in a conventional manner. If so desired, cross-linking agents or cross-linking accelerators for the elastomer, liquid diluents, fillers and pigments such as titanium oxide, calcium carbonate, or carbon, and other modifying agents may be added before further processing. The modifying agents may include plasticizers such as dioctyl phthalate, tricresyl phthalate, chlorinated diphenyl, chlorinated triphenyl, chlorinated naphthalene or paraffin. Depending on the ultimate product, surface active agents, coloring matter, blowing agents may be incorporated in the polymerization mixture. It may also be desirable further to modify the solution of PAG and elastomer by incorporating therein non-elastomeric synthetic resins within the limits of compatibility, and such resins may include homopolymers or copolymers of vinyl chloride, styrene, and methacrylates, also polycarbonates.

In converting the polymerization mixture to a film or to fibers, conventional dry or wet methods may be used. The polymerization mixture may be used directly or after dilution for coating glass, woven or non-woven textiles, and many other substrates to produce desirable surface texture. The films are transparent and have better elongation and elastic recovery than otherwise comparable PAG films. They may be formed by evaporation of solvent from a layer of the solution deposited on a non-porous substrate, such as glass and metal, and stripped from the substrate. The solvent may also be leached from the solution layer by immersion of the coated substrate in a suitable non-solvent liquid. Fibers are produced in an analogous manner. The films are useful for packaging where their specific properties are needed.

The following examples are further illustrative of this invention. All percentage values are by weight unless stated otherwise.

EXAMPLE 1

187.0 g. γ-Methyl-L-glutamate N-carboxy anhydride was suspended in a mixture of 1058 g. 1,2-dichloroethane, 51 g. toluene, and 125 g. of a 20% solution of polyalkyl acrylate ("Teisan Resin SB–207," a product of Teikoku Chemical Industry Co., Ltd.). Polymerization was started at 10° C. with stirring by adding 1.4 g. triethylamine. The solution obtained was homogeneous, viscous and clear.

It was diluted to 10% polymer concentration with 302 g. perchloroethylene, and a uniform layer, 0.5 mm. thick, was spread on a glass plate with an applicator and dried at 80° C. The film removed from the casting surface had a thickness of 31μ.

The film consisted of a blend of 17 weight parts polyalkyl acrylate per 100 parts PAG, had a tensile strength of 4.00 kg./mm.$^2$, an elongation of 152%, an elastic modulus of 52.0 kg./mm.$^2$ (Young's modulus), and an elastic recovery (20% extended) of 88.1%. A similarly produced film of polymethyl glutamate without the elastomer had a tensile strength of 4.06 kg./mm.$^2$, an elongation of 128%, modulus of 114.3 kg./mm.$^2$, and elastic recovery of 38.2%.

A film prepared by polymerizing methyl glutamate-NCA in the same solvent in the presence of 40 parts polychloroprene(Neoprene AD, E. I. du Pont de Nemours & Co.) per 100 parts polymethyl glutamate at 0° C. had a tensile strength of 3.70 kg./mm.$^2$, elongation of 201%, modulus of 33.4 kg./mm.$^2$, and elastic recovery of 92.1%.

The polymerization mixture prepared in the presence of the polyalkyl acrylate was also diluted with 1.2-dichloroethane-perchloroethylene-toluene (7:1:1 by weight) to a viscosity of about 1 poise and then spread in a uniform layer of 0.3 mm. by means of a gravure coater on polyvinyl chloride leather coated with a two-component polyurethane adhesive layer. The solvents were evaporated at 120° C., and the product was crumpled by hand to impart a leather-like pattern to its surface. The appearance and touch of this product were closely similar to natural leather. In an abrasion resistance test according to Japanese Industrial Standards K–6772, no change was observed after 10,000 cycles, indicating excellent durability.

EXAMPLE 2

γ-Methyl-D-glutamate - N - carboxy anhydride was polymerized in a dichloroethane solution of enough polychloroprene to make the ultimate weight ratio of the elastomer to the polymethyl glutamate 20:100. Triethylenediamine was employed as the polymerization initiator in a mole ratio of 1:75 to the AG-NCA. A polymerization temperature of 15° C. was maintained. The polymerization mixture so obtained was a homogeneous and clear solution readily converted into a transparent film by the methods described in Example 1.

The film had a tensile strength of 3.92 kg./mm.$^2$, an elongation of 152%, a modulus of 60.4 kg./mm.$^2$, and an elastic recovery of 89.3%.

EXAMPLE 3

201 g. γ-ethyl-D-glutamate N-carboxy anhydride was dissolved in a solution of 39 g. elastomeric polyalkyl acrylate ("Coponyl AG–2," a product of Nippon Synthetic Chemical Industry Co., Ltd.) in 1620 g. methyl ethyl ketone and 700 g. toluene. The polymerization was started at 9° C. with 1.4 g. triethylenediamine and was completed after 24 hours, when a homogeneous, viscous, and clear solution was obtained.

This solution was spread in a uniform layer of 0.5 mm. on a glass plate with an applicator and then dried at 80° C. The pliable film removed from the casting surface was 32μ thick.

The solution also was spread in a uniform layer of 0.2 mm. on a synthetic leather consisting of a two-component polyurethane at a velocity of 20 meters per minute with a doctor knife coater, and the product obtained closely resembled natural leather. In an abrasion resistance test, no change was observed after 10,000 cycles, indicating high durability.

The afore-mentioned pliable film contained 25% polyacrylate based on the PAG present. Its physical properties (as compared to those of a similarly prepared polyethyl glutamate film) included a tensile strength of 3.00 (2.89) kg./mm.$^2$, elongation of 167 (116) percent, modulus of 53.8 (95.4) kg./mm.$^2$, and elastic recovery of 80.8 (42.3) percent.

EXAMPLE 4

γ-Ethyl glutamate N-carboxy anhydride was polymerized at 3° C. in a mixture of 1,2-dichloroethane and methyl-i-butylketone (92:8 by volume) in the presence of 33% dissolved polychloroprene, based on the PAG ultimately formed. The initiator was n-tributylamine and was employed in a mole ratio of 1:74 based on the AG-NCA.

A film was prepared from the viscous, homogeneous and clear polymerization solution as described above. Its tensile strength and modulus values were slightly lower than those achieved by means of polyalkyl acrylate in Example 3, its elongation and elastic recovery slightly better.

EXAMPLE 5

γ-Ethyl glutamate N-carboxy anhydride was polymerized at 12° C. in a chloroform solution of an acrylonitrile-butadiene copolymer ("JSRN 230S," Japan Synthetic Rubber Co., Ltd.) by means of triethylamine (1:70, based on the AG-NCA). The weight ratio of the copolymer to the PAG in a film prepared from the clear and homogeneous polymerization mixture as described above was 22:100. The tensile strength of the film was only 2.66 kg./mm.$^2$. It was closely similar in elongation, Young's modulus, and elastic recovery to the film consisting of a blend of polyethyl glutamate and polychloroprene referred to in Example 4.

EXAMPLE 6

A mixture of 18.7 g. γ-methyl-L-glutamate N-carboxy anhydride and 20.1 g. γ-ethyl-L-glutamate N-carboxy anhydride was added to a solution prepared from 309 g. 1,2-dichloroethane, 34 g. toluene, and 17.6 g. of a 40% solution of polyalkyl acrylate ("Teisan Resin SB–111C," Teikoku Chemical Industry Co., Ltd.) at 4° C. 0.2 g. triethylamine was added last, whereby polymerization was initiated. After being kept at 4° C. for 10 hours, the mixture was allowed to stand at room temperature until the polymerization was completed. There was obtained a homogeneous, viscous and clear solution. A film 28μ thick was prepared as above. It had a tensile strength of 3.52 kg./mm.$^2$, elongation of 188%, Young's modulus of 40.1 kg./mm.$^2$, and elastic recovery (20% extended) of 87.7%.

Natural rubber and other elastomers mentioned above, but not specifically illustrated by examples, when present as solutes during polymerization of γ-methyl and γ-ethyl glutamate N-carboxy anhydride, produced results analogous or closely similar to those reported in Examples 1 to 6. The blends produced by polymerization of the γ-propyl and γ-butyl glutamate N-carboxy anhydrides in the presence of elastomers had properties which reflected the lower tensile strength of the polyalkyl glutamates having 3 and 4 carbon atoms in the alkyl group, but not qualitatively different from those indicated in the examples. For this reason, the polymethyl and polyethyl glutamates are preferred at this time in the blends of the invention.

Sufficiently sensitive apparatus permits the effects of minute amounts of PAG on the mechanical properties of a structure otherwise consisting of elastomer to be detected, and the effects of very small amounts of elastomer on objects or coatings otherwise consisting of PAG can be detected. These effects are not of practical significance at this time unless the ratio of PAG to elastomer in the mixture is approximately between 9:1 and 2:3, and the procedures illustrated in the examples may be employed for producing solid mixtures containing between 11% and 150% elastomer based on the weight of the polyalkyl glutamate.

What is claimed is:

1. A method of preparing a homogeneous and clear solution of an optically active poly-γ-lower-alkyl glutamate and of an elastomer which comprises holding an optically active γ-lower-alkyl glutamate N-carboxy anhydride under polymerization conditions while dispersed in a solution of said elastomer in an organic solvent until said poly-γ-lower-alkyl glutamate is formed, said poly-γ-lower-alkyl glutamate being soluble in said solvent, said elastomer being inert to said γ-lower-alkyl glutamate N-carboxy anhydride and free from amino groups, oxirane groups, and isocyanate groups.

2. A method as set forth in claim 1, wherein said elastomer is a member of the group consisting of natural rubber, polychloroprene, isoprene-isobutylene copolymer, acrylonitrile-butadiene copolymer, butyl rubber, polybutene, butadiene-styrene copolymer, polybutadiene, polyisoprene, chlorinated polyethylene, ethylene-propylene copolymer, and polyalkyl acrylate.

3. A method as set forth in claim 1, wherein said elastomer is polyalkyl acrylate, acrylonitrile butadiene copolymer or polychloroprene.

4. A method as set forth in claim 1, wherein the weight ratio of said γ-lower-alkyl glutamate N-carboxy anhydride to said elastomer is between approximately 9:1 and approximately 2:3.

5. A method as set forth in claim 4, wherein said polymerization conditions include a temperature of −20° to 30° C. and the presence of an effective amount of a polymerization initiator, said solvent and said elastomer not inhibiting said polymerization.

6. A clear and homogeneous solution of an optically active poly-γ-lower-alkyl glutamate and of an elastomer in an organic solvent, the weight of said elastomer being between substantially 11% and 150% of the weight of said glutamate, said solution containing a combined amount of at least 10% by weight of said elastomer and of said glutamate, and being homogeneous and clear when diluted with said solvent to a combined concentration of 10% by weight of said elastomer and of said glutamate, said elastomer being a member of the group consisting of natural rubber, polychloroprene, isoprene-isobutylene copolymer, acrylonitrile-butadiene copolymer, butyl rubber, polybutene, butadiene-styrene copolymer, polybutadiene, polyisoprene, chlorinated polyethylene, ethylene-propylene copolymer, and polyalkyl acrylate.

7. A solution as set forth in claim 1, wherein lower-alkyl in said poly-γ-lower alkyl glutamate has up to four carbon atoms.

References Cited
UNITED STATES PATENTS

| | | | |
|---|---|---|---|
| 3,676,206 | 7/1972 | Nishitani et al. | 260—858 |
| 3,345,433 | 10/1967 | Wasserman et al. | 200—857 U |
| 3,585,161 | 6/1971 | Akamatsu et al. | 260—858 |
| 3,594,351 | 7/1971 | Uchida et al. | 260—858 |
| 3,441,526 | 4/1969 | Zilkha et al. | 260—857 G |

JOHN C. BLEUTGE, Primary Examiner

U.S. Cl. X.R.

117—72, 126 GB, 138.8 D; 260—2.5 N, 3, 31.8 M, 33.6 A, 33.6 UA, 33.8 UA, 41 B, 41.5 R, 857 L, 857 D

UNITED STATES PATENT OFFICE
CERTIFICATE OF CORRECTION

Patent No. 3,833,684                    Dated September 3, 1974

Inventor(s) AKIRA AKAMATSU ET AL

It is certified that error appears in the above-identified patent and that said Letters Patent are hereby corrected as shown below:

In the heading, 7th line after the Title, change "Dec. 10" to -- Dec. 30 --.

Signed and sealed this 19th day of November 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,833,684　　　Dated September 3, 1974

Inventor(s) AKIRA AKAMATSU ET AL

It is certified that error appears in the above-identified patent and that said Letters Patent are hereby corrected as shown below:

In the heading, 7th line after the Title, change

"Dec. 10" to -- Dec. 30 --;

8th line after the Title, change "44/1,751" to -- 45/1,751 --.

This certificate supersedes Certificate of Correction issued Nov. 19, 1974.

Signed and sealed this 4th day of February 1975.

(SEAL)
Attest:

McCOY M. GIBSON JR.
Attesting Officer

C. MARSHALL DANN
Commissioner of Patents